US006772031B1

(12) United States Patent
Strand (10) Patent No.: US 6,772,031 B1
(45) Date of Patent: Aug. 3, 2004

(54) METHOD OF, SYSTEM FOR AND COMPUTER PROGRAM PRODUCT FOR PROVIDING A JOB MONITOR

(75) Inventor: Paul W. Strand, Rocklin, CA (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 09/583,391

(22) Filed: May 30, 2000

(51) Int. Cl.[7] .............................................. G06F 19/00
(52) U.S. Cl. ...................... 700/108; 718/100; 345/736
(58) Field of Search ................... 700/99–102, 108–111; 709/102–105; 345/700, 733–737, 969; 718/100, 102–105

(56) References Cited

U.S. PATENT DOCUMENTS

| 4,724,521 A | | 2/1988 | Carron et al. ................ 364/300 |
|---|---|---|---|
| 4,839,798 A | | 6/1989 | Eguchi et al. ............... 364/200 |
| 5,101,425 A | | 3/1992 | Darland et al. ................ 379/34 |
| 5,909,217 A | * | 6/1999 | Bereiter ....................... 345/854 |
| 5,983,051 A | | 11/1999 | Mishima et al. ............... 399/83 |
| 6,032,122 A | * | 2/2000 | Gertner et al. .................. 705/8 |
| 6,115,044 A | * | 9/2000 | Alimpich et al. ........... 345/855 |
| 6,128,016 A | * | 10/2000 | Coelho et al. ............... 345/808 |
| 6,151,023 A | * | 11/2000 | Chari .......................... 345/854 |
| 6,151,024 A | * | 11/2000 | Alimpich et al. ........... 345/854 |
| 6,466,663 B1 | * | 10/2002 | Ravenscroft et al. .. 379/265.01 |

FOREIGN PATENT DOCUMENTS

| JP | 62065119 A2 | 3/1987 | ............. G06F/1/00 |
|---|---|---|---|
| JP | 62217351 A2 | 9/1987 | ........... G06F/15/00 |
| JP | 63128462 A2 | 6/1988 | ........... G06F/15/00 |
| JP | 63237155 A2 | 10/1988 | ........... G06F/15/00 |
| JP | 1258166 A2 | 10/1989 | ........... G06F/15/16 |
| JP | 3019034 A2 | 1/1991 | ............. G06F/9/46 |
| JP | 3231597 A2 | 10/1991 | ............ H04Q/9/00 |
| JP | 3262051 A2 | 11/1991 | ........... G06F/11/30 |
| JP | 4257922 A2 | 9/1992 | ............. G06F/9/06 |
| JP | 4257961 A2 | 9/1992 | ........... G06F/15/00 |
| JP | 7013894 A2 | 1/1995 | ........... G06F/13/00 |
| JP | 8235002 A2 | 9/1996 | ............. G06F/9/46 |
| JP | 10046504 A | * | 2/1998 |
| JP | 2002049587 A | * | 2/2003 |

OTHER PUBLICATIONS

"Object Hierarchy for Palladium Print Management Graphical Interface," IBM Technical Disclosure Bulletin, Oct. 1996, USA v. 39, n. 10, pp. 21–22.*

Job Monitoring, (Metropolitan Systems' JobTraK 2.1 AS/400 Job Management Software), MIDRANGE Systems Jan. 14, 1994, v7 n1 p 35 (1).

* cited by examiner

Primary Examiner—Maria N. Von Buhr
(74) Attorney, Agent, or Firm—Prentiss Wayne Johnson (57) ABSTRACT

A graphical user interface for monitoring a job executing on a remote host system from a local workstation by displaying a tree view of the system, a queue within the system, a job within the queue, and a file related to the job. The graphical user interface displays the tree view; displays a first level of the tree, the first level comprising one or more system nodes, each system node representing a host system; displays a second level of the tree, the second level comprising one or more job queue nodes, each job queue node branching below a system node representing a job queue in the host system corresponding to the system node; and displays a third level of the tree, the third level comprising one or more job nodes, each job node branching below a job queue node representing a job in the job queue corresponding to the job queue node.

27 Claims, 10 Drawing Sheets

METHOD OF, SYSTEM FOR AND COMPUTER PROGRAM PRODUCT FOR PROVIDING A JOB MONITOR

A portion of the Disclosure of this patent contains document material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to computer program management in a distributed environment, and more particularly to a job monitor for monitoring from a workstation a computer program executing on a host system.

2. Description of the Related Art

A user such as a programmer developing a computer program on a host system may access and communicate with the host system from a host attached terminal or a workstation emulating such a host attached terminal. The user typically develops the program in a development cycle that includes edit, compile, job status check, and test. By using a host-based job monitor, the user may check the status of the job to estimate the time until completion, ensure execution is not blocked, check return codes, view output, or other associated tasks. Although the host-based job monitor can notify the user when a job is complete, the notification typically is not received until the user causes an interrupt to the host system. Such an interrupt may be caused by the user pressing an enter or return key on the terminal or workstation keyboard while viewing a job queue.

Another way that the user may develop the computer program for the host system is Remote Edit/Compile/Debug which provides a workstation-based environment for performing the edit, compile, and debug tasks associated with host application development. Application parts, such as COBOL source code, COBOL copy books, and host JCL, are kept in partitioned datasets (PDS) or partitioned datasets extended (PDSE) on the host. These files may be accessed and used through a project, such as an IBM® Multiple Virtual Storage (MVS®) project (IBM® and MVS® are registered trademarks of International Business Machines Corporation in the United States, other countries, or both.). The Remote Edit/Compile/Debug user also needs the job monitor capability. However, the user typically uses either the host-based job monitor or a host-like character interface logged into the host system to obtain the desired job monitoring capability.

While the above job monitoring capabilities may provide job monitoring, they may do so while also providing problems such as performance, usability, integration, and functionality problems. In particular, the increased overhead of workstation-based interfaces logging in to the host system may result in a performance degradation compared to the host-based job monitor. The usability of such non-graphical user interfaces in a graphical user interface based workstation environment may be decreased and suffer from inconsistencies. For example, integration of the non-graphical user interfaces into the workstation environment may be more difficult or providing additional functionality in such a non-graphical user interface may be more difficult.

Thus, there is a clearly felt need for a method of, system for, and computer program product for providing an improved job monitor for monitoring from a workstation a computer program executing on a host system.

SUMMARY OF THE INVENTION

The present invention comprises a method, system, and article of manufacture for monitoring a job executing on a remote host system from a local workstation by use of a graphical user interface which displays a tree view of the system, a queue within the system, a job within the queue, and a file related to the job. The method comprises the steps of: displaying a tree view; displaying a first level of the tree, the first level comprising one or more system nodes, each system node representing a host system; displaying a second level of the tree, the second level comprising one or more job queue nodes, each job queue node branching below a system node representing a job queue in the host system corresponding to the system node; and displaying a third level of the tree, the third level comprising one or more job nodes, each job node branching below a job queue node representing a job in the job queue corresponding to the job queue node.

One aspect of a preferred embodiment of the present invention connects to the host system corresponding to a selected node in response to selecting the selected node.

Another aspect of a preferred embodiment of the present invention displays the tree view in a first portion of a display; and displays in a second portion of the display a table view based on the currently selected node in the tree view wherein the fields that are displayed depend on the type of the selected node.

Another aspect of a preferred embodiment of the present invention displays in the table view a system nickname, address, and user ID corresponding to a selected system node if the selected node is a system node.

Another aspect of a preferred embodiment of the present invention displays a queue table view if the selected node is a job queue node.

Another aspect of a preferred embodiment of the present invention displays a job table view if the selected node is a job node.

Another aspect of a preferred embodiment of the present invention allows the selected node to be viewed, canceled, released, or purged if the selected node is a job node.

Another aspect of a preferred embodiment of the present invention filters the information displayed in the table view by a filter selected from the group comprising a default filter and a user specified filter.

Another aspect of a preferred embodiment of the present invention displays a system node corresponding to an entry in a system metadata file.

Another aspect of a preferred embodiment of the present invention encodes the system metadata file in Extensible Markup Language (XML).

The present invention has the advantage of providing an improved user interface for a job monitor.

The present invention has the further advantage of providing improved usability in a user interface for a job monitor.

The present invention has the further advantage of providing improved integration in a user interface for a job monitor.

The present invention has the further advantage of providing improved functionality in a graphical user interface for a job monitor.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

An embodiment of the invention is now described with reference to the figure where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
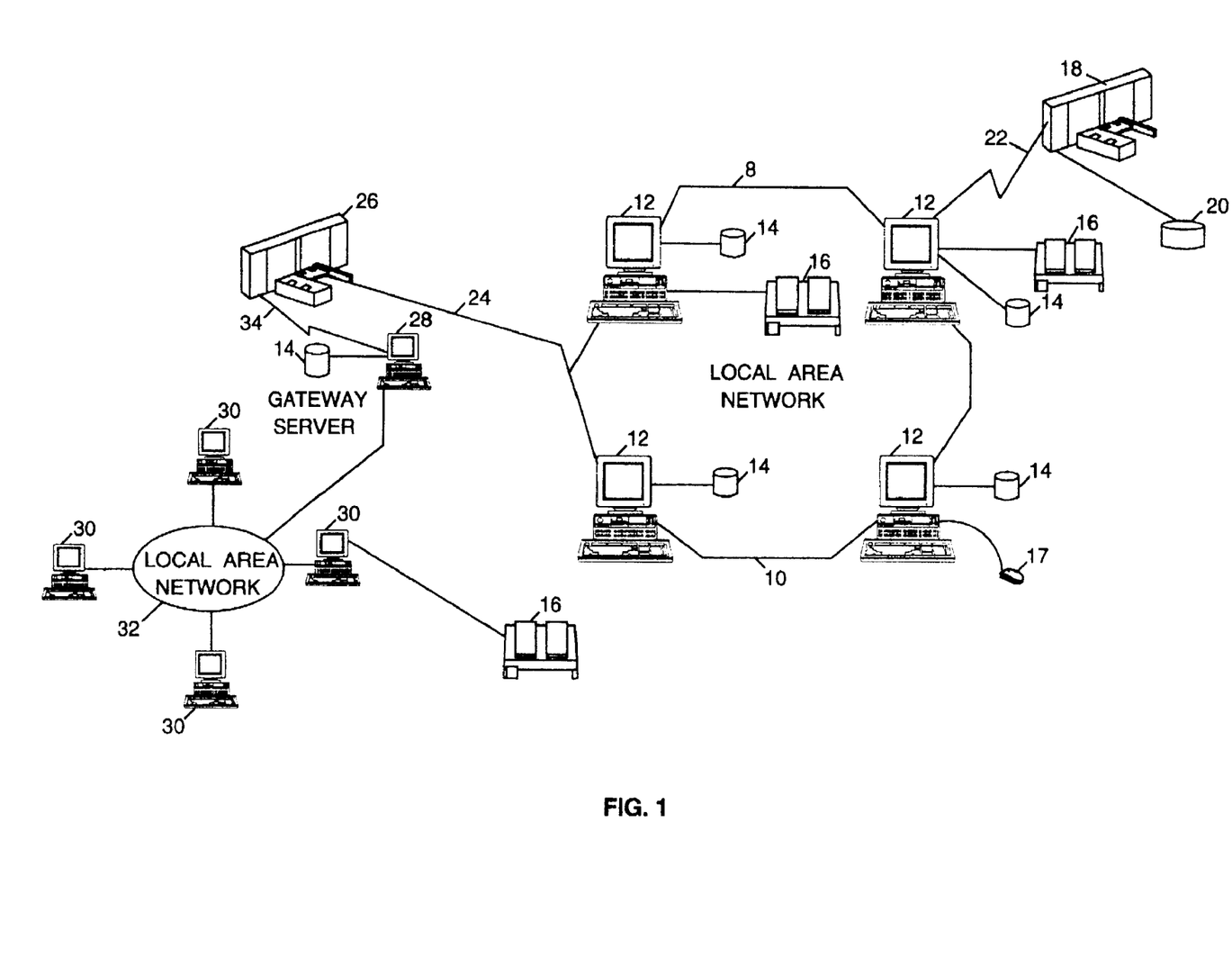
FIG. 1 is a block diagram of a distributed computer system used in performing the method of the present invention, forming part of the apparatus of the present invention, and which may use the article of manufacture comprising a computer-readable storage medium having a computer program embodied in said medium which may cause the computer system to practice the present invention.

Referring first to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

As will be appreciated upon reference to the foregoing, it is often desirable for a user to perform host application development on a workstation 12 in lieu of performing the application development on the host 18 itself. Remote Edit/Compile/Debug provides such a workstation environment for performing the edit, compile, and debug tasks associated with host application development. Host application parts, such as COBOL source code, COBOL copy books, and host Job Control Language (JCL), may be stored in PDS or PDSE data sets on storage device 20 connected to the host 18. The Remote Edit/Compile/Debug workstation environment allows these files to be accessed and used on the workstation 12 so that they may later be compiled, executed, and debugged in jobs executing on the host. The present invention provides an improved user interface for monitoring from the local workstation 12 such jobs executing on the remote host system 18 by use of a graphical user interface which displays a tree view of the system, a queue within the system, a job within the queue, and a file related to the job.

Figure 2:
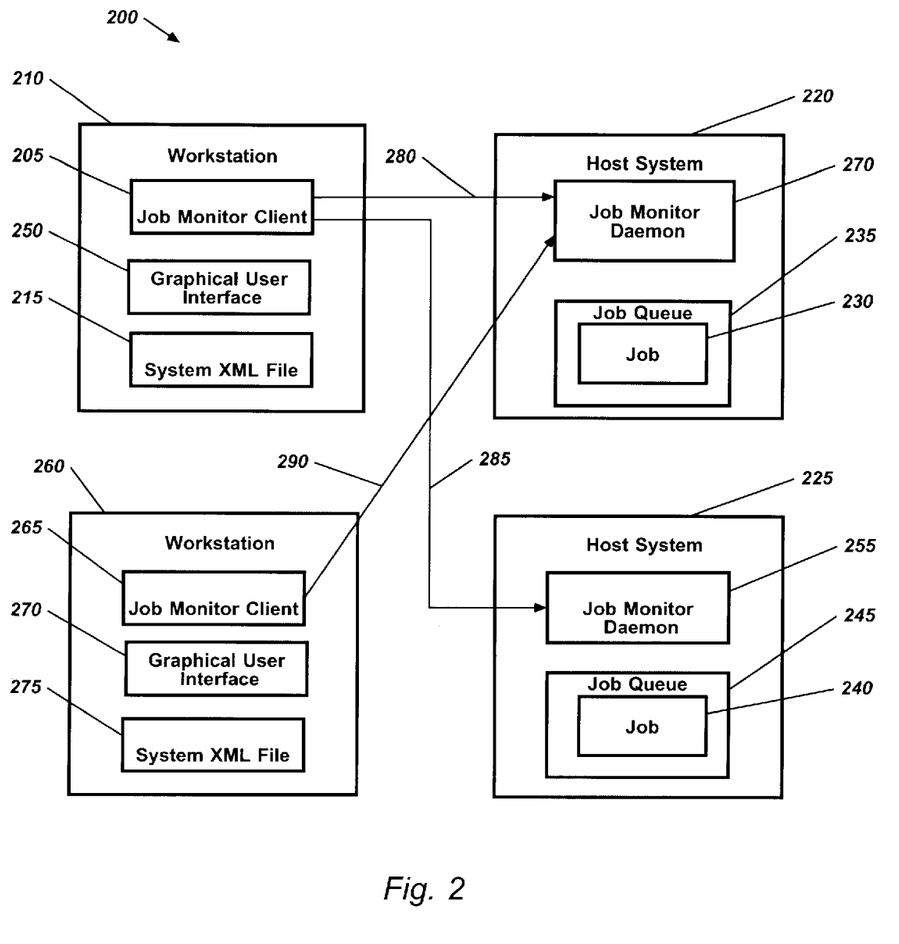
FIG. 2 is a block diagram of a distributed computer system practicing the present invention.
Figure 8:
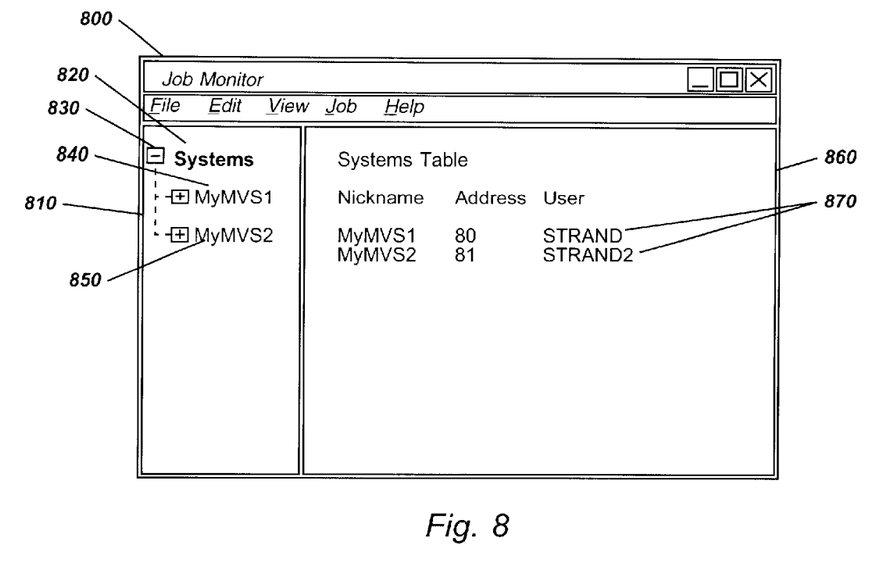
FIG. 8 through FIG. 14 illustrate graphical user interfaces preferred in carrying out the preferred embodiment of the present invention.
Figure 9:
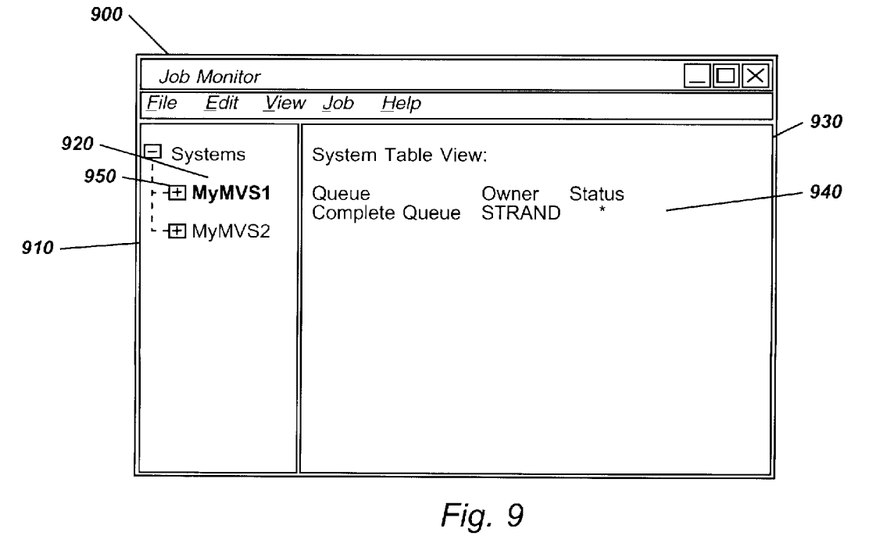

Referring now to FIG. 2, when a job monitor client 205 on a workstation 210 is first started 310, the Job Monitor client 205 gets a system XML file 215 which contains descriptions of host systems 220 and 225 to which the job monitor client 205 may connect to monitor jobs such as job 230 located in job queue 235 on host system 220, or job 240 located in job queue 245 on host system 225. The job monitor client 205 then populates a first level of a tree with system nodes where there is one system node corresponding to each host system described in the system XML file 215. The job monitor client 205 then displays a tree view 810 depicting the tree using the graphical user interface 800 as shown in FIG. 8. The graphical user interface 800 displays the tree comprising a first level node Systems 820. The user may expand the node 820 by clicking on an expand button 830 corresponding to the node 820. This expansion causes the further display of two second level nodes MyMVS1 840 and MyMVS2 850. The job monitor client 205 may also display a table view or pane 860 depicting information 870 about the tree as shown in the graphical user interface 800 of FIG. 8. The table view 860 displayed depends upon the currently selected item in the tree view 810, and the fields that are displayed depend on the type of node that is selected. For example, a systems node 820 will have system nickname, address, user ID, etc. Such a table view may be displayed when the user for example selects node MyMVS1 920 in the tree view 910 which causes the System Table View 930 to display information 940 about MyMVS1 920.

Figure 10:
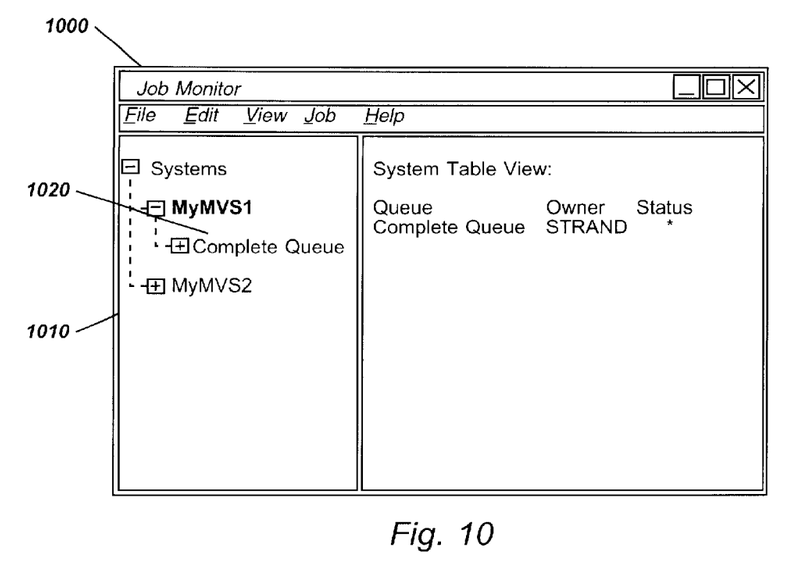
Figure 11:
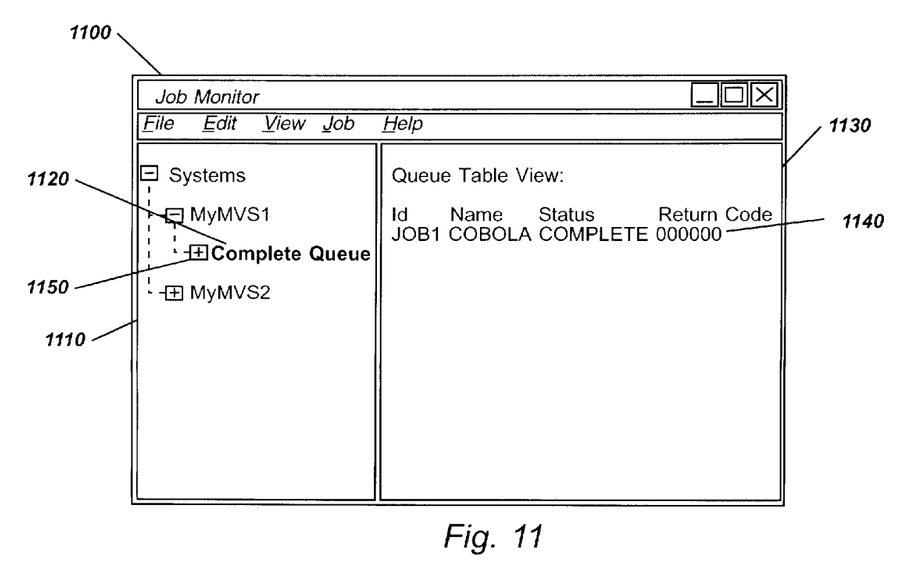

If the user expands node MyMVS1 920 by clicking on the expand button 950, then the tree view 1010 displays a next level of the tree for MyMVS1 920 by displaying queue nodes, such as the Complete Queue node 1120, representing a job queue of the system MyMVS1 920. If the user selects the Complete Queue node 1120, then a Queue Table View 1130 is displayed containing information 1140 about the Complete Queue.

Figure 12:
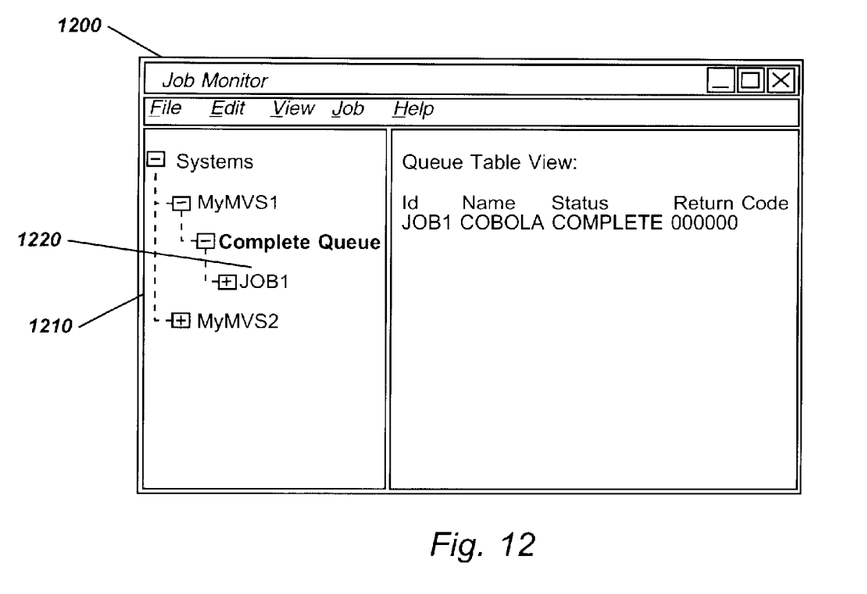
Figure 13:
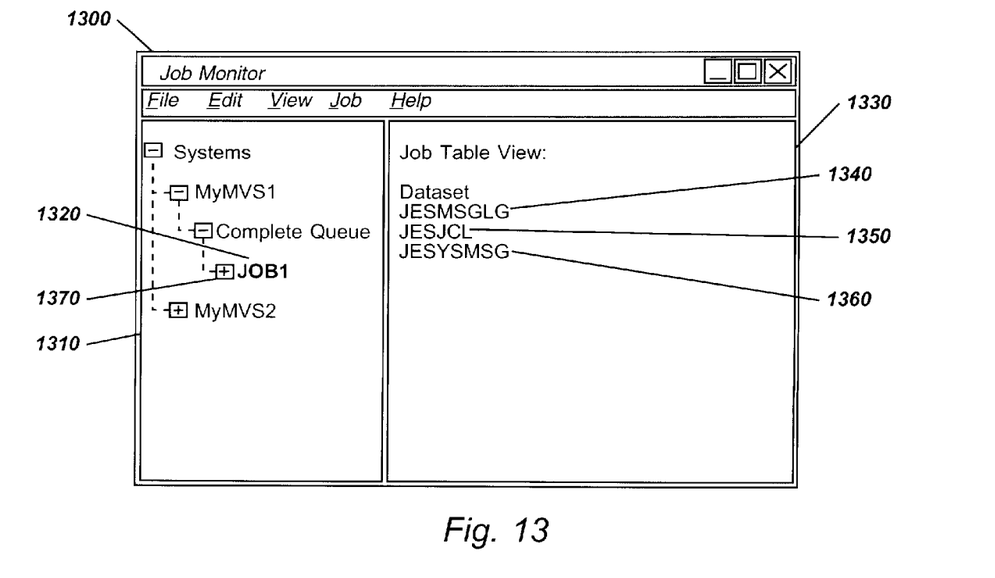
Figure 14:
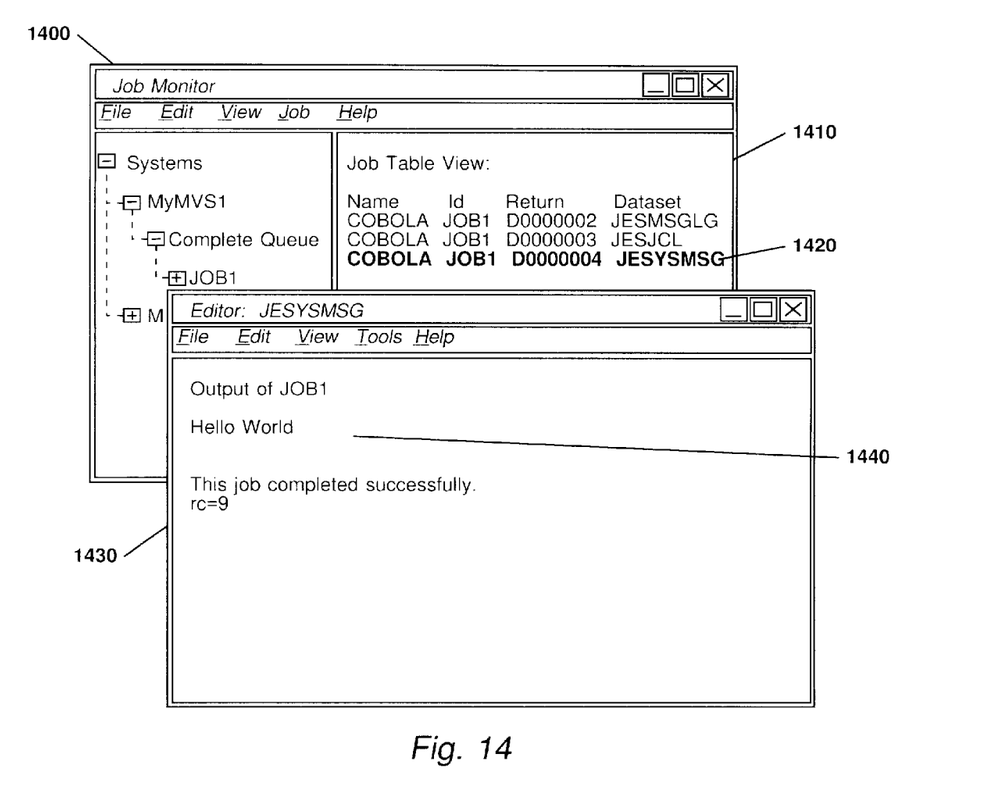

Similar to the prior expansions of systems nodes, the user may expand the Complete Queue node 1120 by clicking on the expand button 1150 which expands the tree view 1210 to display a next level of the tree containing job nodes such as JOB 1 1220. Upon selection of the JOB1 node 1320 by the user, the graphical user interface 1300 displays a Job Table View 1330 containing information such as a list of files, 1340, 1350, and 1360, comprising the output of JOB1 1320. Selection by the user of a job file 1420 listed in the Job Table View causes a viewer 1430 to open and display the contents 1440 of the file.

Referring now to FIG. 3 through FIG. 7, the flowcharts illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

Figure 3:
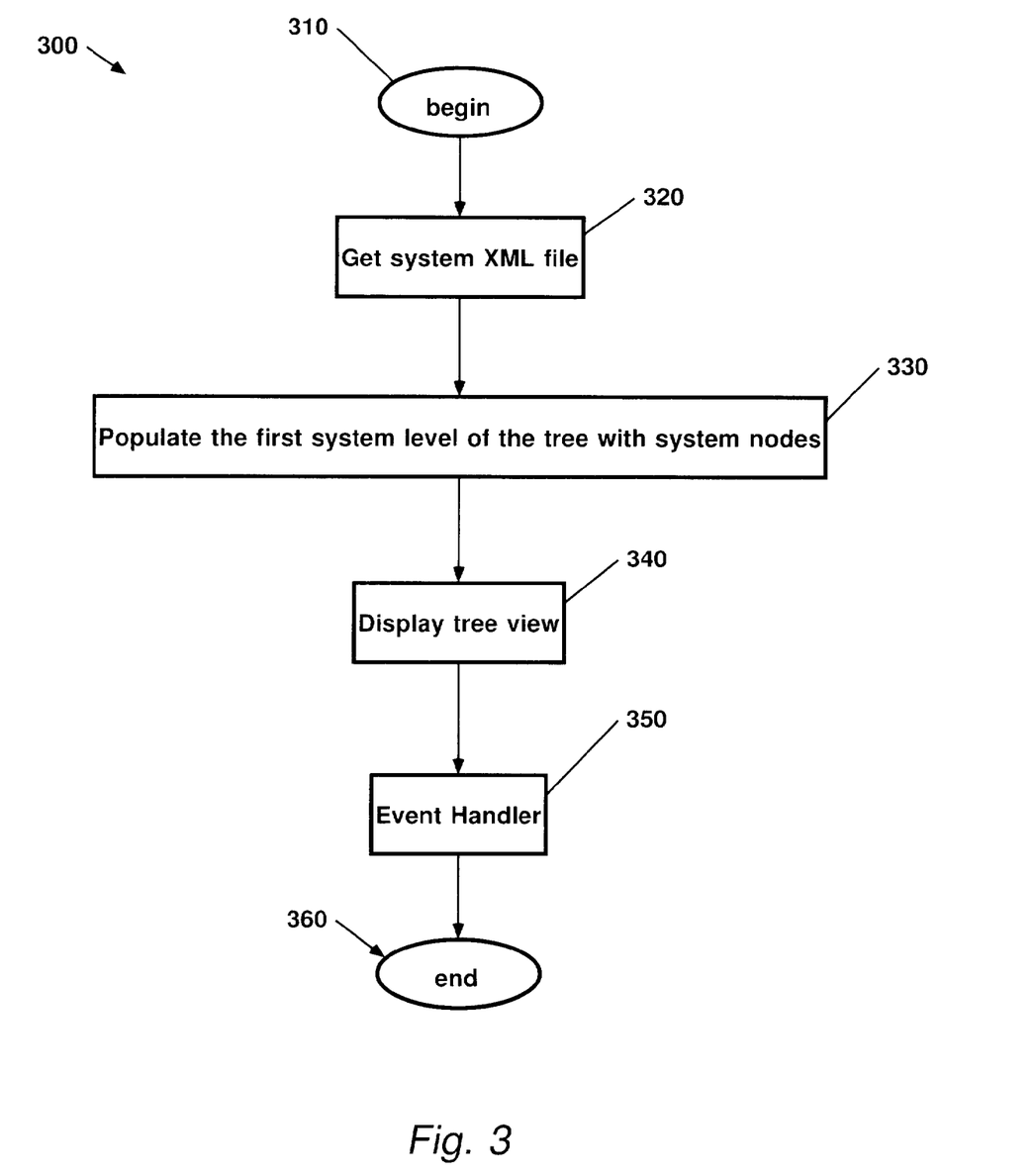
FIG. 3 is a flowchart illustrating the operations preferred in carrying out the preferred embodiment of the present invention.

Referring first to FIG. 3, the flowchart 300 illustrates the preferred embodiment of the job monitor. After the program starts 310, process block 320 gets the system XML file 215, and process block 330 populates the first highest level of the tree with a Systems node 820 and the next second level of the tree with particular system nodes 840 and 850 from the system XML file 215. Process block 340 then displays the tree view 810. Thereafter, process block 350 provides a graphical user interface 800 by handling user interaction events, such as the user exiting the job monitor 360.

Figure 4:
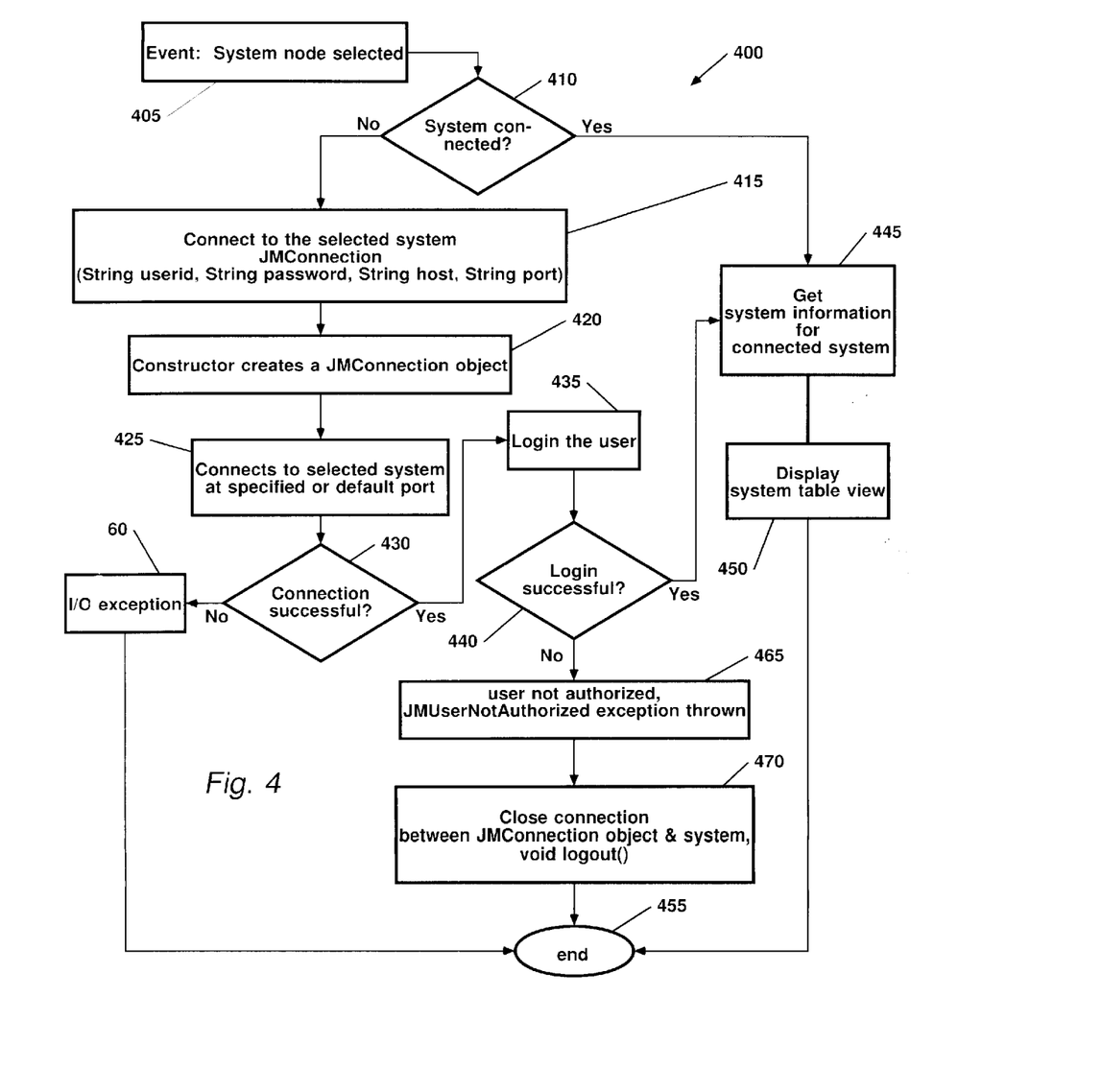
FIG. 4 through FIG. 7 are flowcharts illustrating the operations preferred in carrying out the event handler portion of the preferred embodiment of the present invention.

Referring now to FIG. 4 through FIG. 7, these flowcharts 400, 500, 600 and, 700 are an expansion of the event handler process block 350. FIG. 4 illustrates that portion of the event handler process which handles a system node selection by the user. If the user selects a system node, such as MyMVS1 920, which generates the event 405, then decision block 410 determines if the workstation 210 is connected to the host system 220. If the workstation 210 is not connected to the host system 220, then process block 415 requests a connection to the selected host system 920 by creating a connection object in process block 420 which attempts a connection through process block 425 to the selected system 920 at a specified or default port. Thereafter, decision block 430 determines if the requested connection was successful. If the requested connection was successful, then process block 435 requests a login for the user into the host system 920, and decision block 440 determines if the requested login was successful. If the login was successful, then process block 445 gets the system information 940 for the connected system 920, and process block 450 displays the system table view 930 containing this system information 940. Thereafter, this event process ends at process block 455.

Returning now to decision block 410, if the workstation 210 is already connected to the host system 220, then the process continues to process block 445 to get the system information 940 and to process block 450 to display this system information 940 in the system table view 930.

Returning now to decision block 430, if the requested connection was not successful, then process block 460 generates an input/output (I/O) exception, and the event process then ends at process block 455.

Returning now to decision block 440, if the login was not successful, then process block 465 generates a user not authorized exception, process block 470 closes the connection between the connection object and the host system, and the event process then ends at process block 455.

Figure 5:
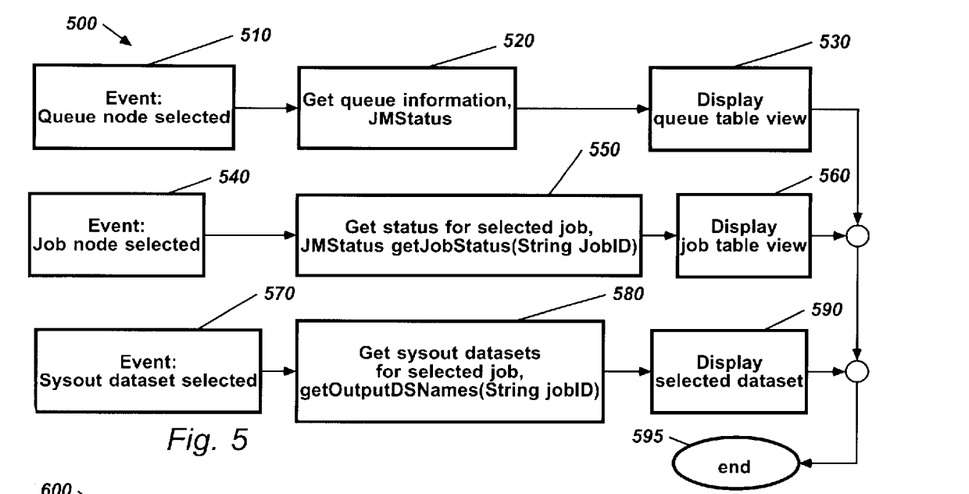

FIG. 5 illustrates that portion 500 of the event handler process which handles the selection by the user of either a queue node 1120, a job node 1320, or a dataset 1420. If the user selects a queue node 1120 generating the event 510, then process block 520 gets from the host system 920 queue information 1140 associated with the selected queue node 1120. Process block 530 displays the retrieved queue information 1140 in the queue table view 1130, and the event process then ends at process block 595. Similarly, if the user selects a job node 1320 generating the event 540, then process block 550 retrieves from the host system 920 job information 1340, 1350, and 1360 associated with the selected job node 1320. Process block 560 displays the retrieved job information 1340, 1350, and 1360 in the job table view 1330, and the event process then ends at process block 595. If the user selects a dataset 1420 generating the event 570, then process block 580 retrieves from the host system 920 the selected dataset 1420, and process block 590 displays the dataset 1440 in the viewer 1430. The event processing then ends at process block 595.

Figure 6:
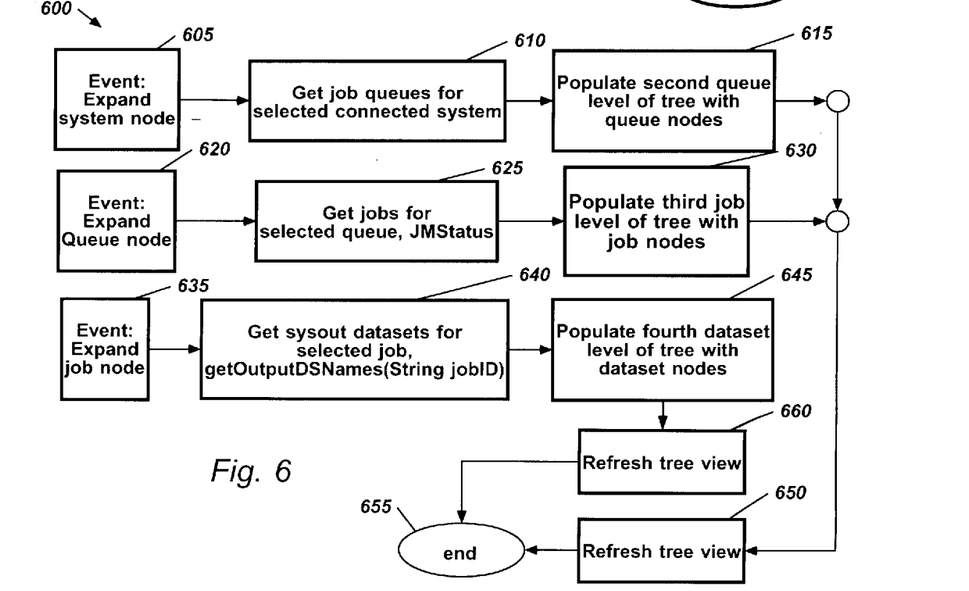

FIG. 6 illustrates that portion 600 of the event handler process which handles the expansion of either a system node 920, a queue node 1120, or a job node 1320 when the user selects the expand button associated with the node, 950, 1150, or 1370, respectively. If the user selects the expand button 950 associated with a system node 920 generating the event 605, then process block 610 gets the job queues 1020 for the selected system 920, and process block 615 populates the second queue level of the tree with queue nodes 1020 corresponding to the retrieved job queues. Thereafter, process block 650 refreshes the tree view 1010 to display the job queue nodes 1020, and the event processing then ends at process block 655. If the user selects the expand button 1150 associated with a queue node 1120 generating the event 620, then process block 625 gets the jobs for the selected queue 1120, and process block 630 populates the third job level of tree with job nodes 1220 corresponding to the retrieved jobs. Processing then continues to process block 650 to refresh the tree view 1210 to display the job nodes 1220. If the user selects the expand button 1370 associated with a job node 1320 generating the event 635, then process block 640 gets the datasets for the selected job, and process block 645 populates the fourth dataset level of the tree with dataset nodes corresponding to the retrieved datasets. Processing continues to process block 660 to refresh the tree view to display the datasets nodes, or alternatively, process block 660 may refresh the job table view to display the datasets, and the event processing then ends at process block 655.

Figure 7:
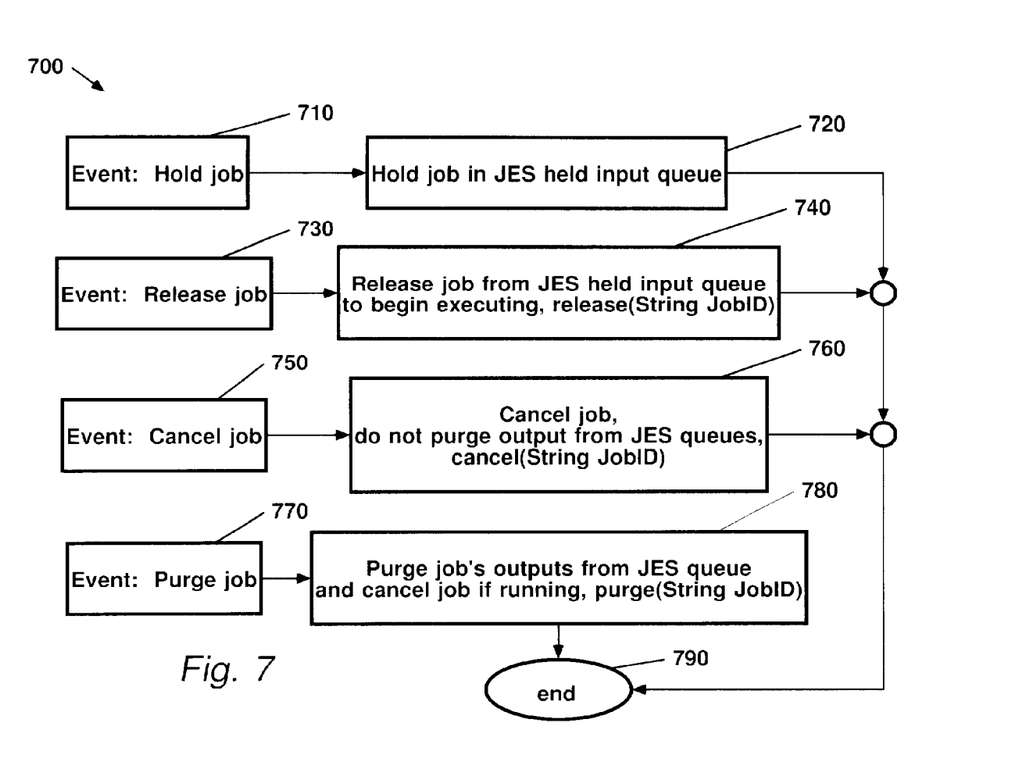

FIG. 7 illustrates that portion 700 of the event handler process which handles job status events when the user holds, releases, cancels or purges a selected. If the user places a job on hold 710, then process block 720 causes the host system to hold the job in the JES held input queue. If the user releases a job 730, then process block 740 causes the host system to release the job from the JES held input queue to begin executing. If the user cancels a job 750, then process block 760 causes the host system to cancel job, but not to purge the job's output from the Job Entry Subsystem (JES) queues. If the user purges a job 770, then process block 780 causes the host system to purge the job's outputs from the JES queue and to cancel the job if running. After process blocks 720, 740, 760, and 780, the event processing ends at process block 790.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

I claim:

1. A method of monitoring a job executing on a remote host system from a local workstation, said method comprising:

displaying on the workstation a tree view;

displaying a first level of the tree, the first level comprising one or more system nodes, each system node representing a remote host system;

displaying a second level of the tree, the second level comprising one or more job queue nodes, each job queue node branching below a system node representing a job queue in the remote host system corresponding to the system node;

displaying a third level of the tree, the third level comprising one or more job nodes, each job node branching below a job queue node representing a job which can be monitored in the job queue corresponding to the job queue node; and connecting to a remote host system corresponding to a selected node in response to selecting the selected node.

2. The method of claim 1 further comprising:

displaying the tree view in a first portion of a display; and displaying in a second portion of the display a table view based on the currently selected node in the tree view wherein the fields that are displayed depend on the type of the selected node.

3. The method of claim 2 wherein if the selected node is a system node, displaying in the table view a system nickname, address, and user name corresponding to the selected system node.

4. The method of claim 2 wherein if the selected node is a job queue node, displaying in the table view a list of jobs in the job queue corresponding to the selected job queue node.

5. The method of claim 2 wherein if the selected node is a job node, displaying in the table view a list of files associated with the job corresponding to the selected job node.

6. The method of claim 5 wherein if the selected node is a job node, providing for the selection of an action to be performed on the selected node, the action selected from the group comprising view, cancel, release, and purge.

7. The method of claim 2 wherein the information displayed in the table view may be filtered by a filter selected from the group comprising a default filter and a user specified filter.

8. The method of claim 1 wherein each system node corresponds to an entry in a system metadata file.

9. The method of claim 8 wherein the system metadata file is encoded in Extensible Markup Language (XML).

10. A distributed computer system for monitoring a job executing on a remote host system from a local workstation, said distributed computer system comprising:

a display for displaying on the workstation a tree view;

a display for displaying a first level of the tree, the first level comprising one or more system nodes, each system node representing a remote host system;

a display for displaying a second level of the tree, the second level comprising one or more job queue nodes, each job queue node branching below a system node representing a job queue in the remote host system corresponding to the system node;

a display for displaying a third level of the tree, the third level comprising one or more job nodes, each job node branching below a job queue node representing a job which can be monitored in the job queue corresponding to the job queue node; and a connection to a remote host system corresponding to a selected node responsive to selection of the selected node.

11. The distributed computer system of claim 10 further comprising:

a display for displaying the tree view in a first portion of the display; and a display for displaying in a second portion of the display a table view based on the currently selected node in the tree view wherein the fields that are displayed depend on the type of the selected node.

12. The distributed computer system of claim 11 wherein if the selected node is a system node, a system nickname, address, and user name corresponding to the selected system node are displaying in the table view.

13. The distributed computer system of claim 11 wherein if the selected node is a job queue node, a list of jobs in the job queue corresponding to the selected job queue node is displayed in the table view.

14. The distributed computer system of claim 11 wherein if the selected node is a job node, a list of files associated with the job corresponding to the selected job node is displayed in the table view.

15. The distributed computer system of claim 14 wherein if the selected node is a job node, providing for a selection of an action to be performed on the selected node, the action selected from the group comprising view, cancel, release, and purge.

16. The distributed computer system of claim 11 wherein the information displayed in the table view may be filtered by a filter selected from the group comprising a default filter and a user specified filter.

17. The distributed computer system of claim 10 wherein each system node corresponds to an entry in a system metadata file.

18. The distributed computer system of claim 17 wherein the system metadata file is encoded in Extensible Markup Language (XML).

19. An article of manufacture for use in a computer system for monitoring a job executing on a remote host system from a local workstation, said article of manufacture comprising a computer-readable storage medium having a computer program embodied in said medium which causes the computer system to execute the method steps comprising:

displaying on the workstation a tree view;

displaying a first level of the tree, the first level comprising one or more system nodes, each system node representing a remote host system;

displaying a second level of the tree, the second level comprising one or more job queue nodes, each job queue node branching below a system node representing a job queue in the remote host system corresponding to the system node;

displaying a third level of the tree, the third level comprising one or more job nodes, each job node branching below a job queue node representing a job which can be monitored in the job queue corresponding to the job queue node; and connecting to a remote host system corresponding to a selected node in response to selecting the selected node.

20. The article of manufacture of claim 19 further comprising:

displaying the tree view in a first portion of a display; and displaying in a second portion of the display a table view based on the currently selected node in the tree view wherein the fields that are displayed depend on the type of the selected node.

21. The article of manufacture of claim 20 wherein if the selected node is a system node, displaying in the table view a system nickname, address, and user name corresponding to the selected system node.

22. The article of manufacture of claim 20 wherein if the selected node is a job queue node, displaying in the table view a list of jobs in the job queue corresponding to the selected job queue node.

23. The article of manufacture of claim 20 wherein if the selected node is a job node, displaying in the table view a list of files associated with the job corresponding to the selected job node.

24. The article of manufacture of claim 23 wherein if the selected node is a job node, providing for the selection of an action to be performed on the selected node, the action selected from the group comprising view, cancel, release, and purge.

25. The article of manufacture of claim 20 wherein the information displayed in the table view may be filtered by a filter selected from the group comprising a default filter and a user specified filter.

26. The article of manufacture of claim 19 wherein each system node corresponds to an entry in a system metadata file.

27. The article of manufacture of claim 26 wherein the system metadata file is encoded in Extensible Markup Language (XML).

* * * * *